United States Patent
Yin et al.

(10) Patent No.: US 9,967,902 B2
(45) Date of Patent: May 8, 2018

(54) SYSTEMS AND METHODS FOR CONTENTION ACCESS REGION IN A LICENSED-ASSISTED ACCESS(LAA)

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days. days.

(21) Appl. No.: 15/423,038

(22) Filed: Feb. 2, 2017

(65) Prior Publication Data

US 2017/0231006 A1   Aug. 10, 2017

Related U.S. Application Data

(60) Provisional application No. 62/291,423, filed on Feb. 4, 2016.

(51) Int. Cl.
*H04W 74/08* (2009.01)
*H04W 72/12* (2009.01)
(Continued)

(52) U.S. Cl.
CPC ... *H04W 74/0816* (2013.01); *H04W 56/0045* (2013.01); *H04W 72/0446* (2013.01);
(Continued)

(58) Field of Classification Search
None
See application file for complete search history.

(56) References Cited

U.S. PATENT DOCUMENTS

| | | | | |
|---|---|---|---|---|
| 2012/0320887 A1* | 12/2012 | Chintalapudi | .... | H04W 74/0841 370/338 |
| 2015/0351115 A1* | 12/2015 | Jeon | ...... | H04W 48/16 455/450 |
| 2017/0231013 A1* | 8/2017 | Ahn | ...... | H04W 74/0883 |

FOREIGN PATENT DOCUMENTS

| | | |
|---|---|---|
| CN | 104333902 | 2/2015 |
| CN | 104539405 | 4/2015 |

(Continued)

OTHER PUBLICATIONS

Intel et al., "Uplink transmission with LBT" 3GPP Draft;R2-151102_LAA_UP_V2, 3rd generation partnership project (3GPP), Mobile Competence Centre;650, Route Des Lucioles; 20150420-20150424 Apr. 19, 2015, 6 pages.*

(Continued)

*Primary Examiner* — Ian N Moore
*Assistant Examiner* — Mewale Ambaye
(74) *Attorney, Agent, or Firm* — Austin Rapp

(57) ABSTRACT

A user equipment (UE) for transmitting signals in a Licensed-Assisted Access (LAA) serving cell is described. The UE includes a processor and memory in electronic communication with the processor. Instructions stored in the memory are executable to receive an uplink (UL) grant from a downlink control information. The instructions are also executable to determine a UL contention access region based on the UL grant. The instructions are further executable to determine clear channel assessment (CCA) timeslots in the UL contention access region. The instructions are additionally executable to perform UL contention access in the UL contention access region with a backoff process.

8 Claims, 17 Drawing Sheets

(51) Int. Cl.
H04W 56/00 (2009.01)
H04W 72/04 (2009.01)
H04W 72/14 (2009.01)
(52) U.S. Cl.
CPC ... *H04W 72/1268* (2013.01); *H04W 72/1289* (2013.01); *H04W 72/14* (2013.01); *H04W 74/085* (2013.01)

(56) References Cited

FOREIGN PATENT DOCUMENTS

| WO | 2015105440 | 7/2015 |
|---|---|---|
| WO | 2015131806 A1 | 9/2015 |

OTHER PUBLICATIONS

Motorola et al., "UL Channel Access for LAA" Oct. 4, 2015, 4 pages.*
Ericsson et al., "Details of Listen-Before-Talk for LAA" San Francisco, USA, Nov. 17, 2014, pp. 7.*
3GPP TR 36.889 V0.2.2 "Technical Specification Group Radio Access Network; Study on Licensed-Assisted Access to Unlicensed Spectrum (Release 13)," R1-150949, Feb. 2015 Feb. 1, 2015.
CableLabs, "CW size considerations for UL LAA-LTE," 3GPP TSG RAN WG1 Meeting #83, R1-156982, Nov. 15, 2015.
CATT, "Design of UL LBT for LAA," 3GPP TSG RAN WG1 Meeting #83, R1-156575, Nov. 15, 2015.
LG Electronics, "UL LBT design in LAA," 3GPP TSG RAN WG1 Meeting #83, R1-156858, Nov. 15, 2015.
CableLabs, "Considerations on LAA-LTE UL Transmissions without LBT," 3GPP TSG RAN WG1 Meeting #83, R1-156983, Nov. 15, 2015.
ZTE, "Discussion on the UL LBT for LAA," 3GPP TSG RAN WG1 Meeting #83, R1-156993, Nov. 15, 2015.
ZTE, "UL framework for LAA," 3GPP TSG RAN WG1 Meeting #83, R1-156994, Nov. 15, 2015.
Broadcom Corporation, "Further Discussion on LAA UL LBT Design," 3GPP TSG-RAN WG1 Meeting #83, R1-157011, Nov. 15, 2015.
Qualcomm Incorporated, "Remaining details of UL LBT operation," 3GPP TSG RAN WG1 #83, R1-157037, Nov. 14, 2015.
NTT DOCOMO, Inc., "Discussion on channel access framework for potential LAA UL," 3GPP TSG RAN WG1 Meeting #83, R1-157220, Nov. 15, 2015.
Intel Corporation, "Uplink transmission with LBT," 3GPP TSG-RAN WG2 #89bis, Bratislava, Slovakia, R2-151102, Apr. 24, 2015.
International Search Report and Written Opinion issued for PCT Application No. PCT/US2017/016558 dated May 12, 2017.
Motorola Mobility, "UL Channel Access for LAA," 3GPP TSG RAN WG1 Meeting #82bis, Malmo, Sweden, R1-155943, Oct. 9, 2015.
Sharp, "Considerations on LAA Channel Access," 3GPP TSG RAN WG1 Meeting #80bis, Belgrade, Serbia, R1-151710, Apr. 24, 2015.
Samsung, "Discussion on LBT for UL transmission", 3GPP TSG RAN WG1 Meeting #83, Anaheim, California, USA, R1-156768, Nov. 22, 2015.

* cited by examiner

SYSTEMS AND METHODS FOR CONTENTION ACCESS REGION IN A LICENSED-ASSISTED ACCESS(LAA)

RELATED APPLICATIONS

This application is related to and claims priority from U.S. Provisional Patent Application No. 62/291,423, entitled "SYSTEMS AND METHODS FOR CONTENTION ACCESS," filed on Feb. 4, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
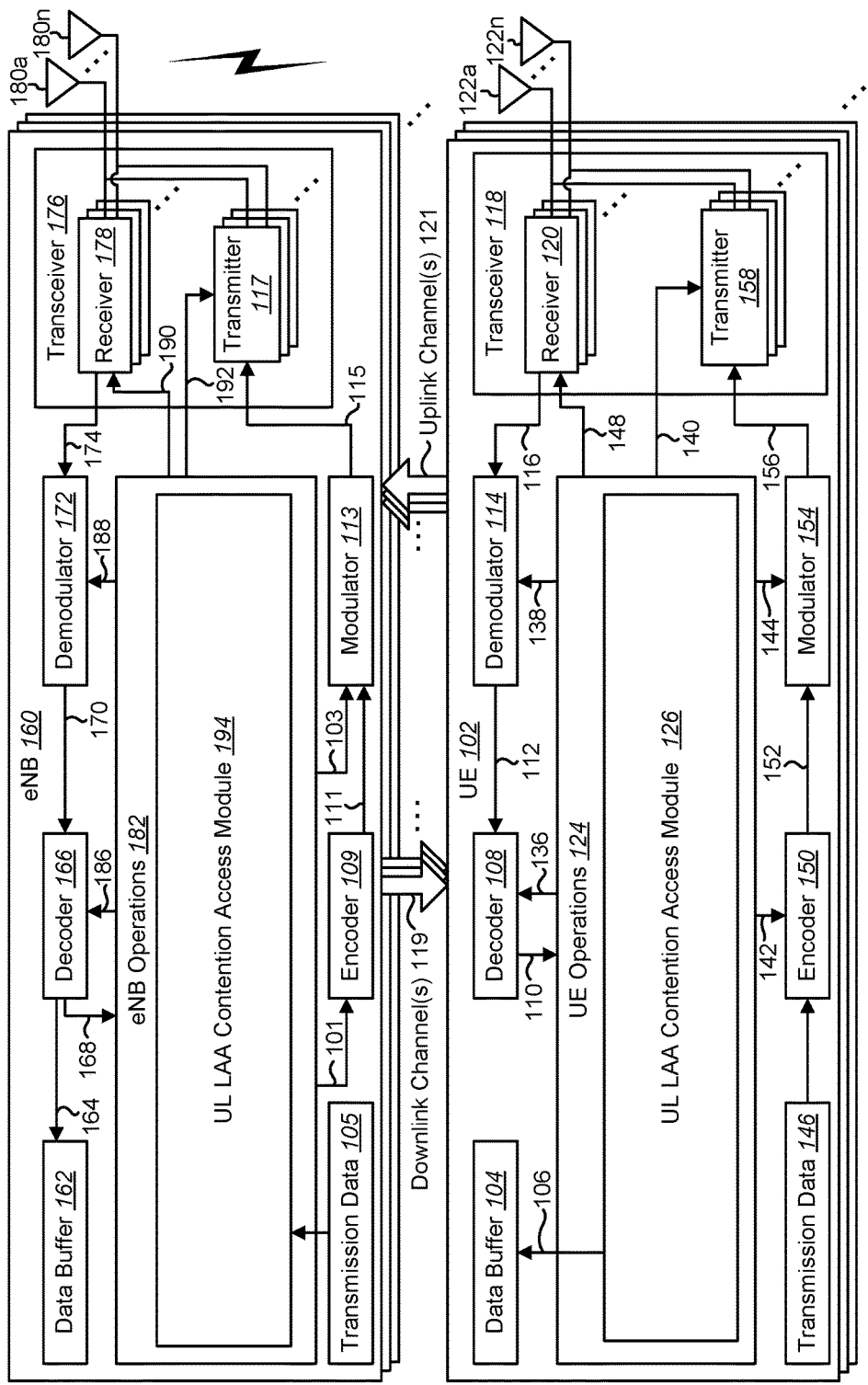
FIG. 1 is a block diagram illustrating one implementation of one or more evolved NodeBs (eNBs) and one or more user equipments (UEs) in which systems and methods for contention access may be implemented.

A user equipment (UE) for transmitting signals in a Licensed-Assisted Access (LAA) serving cell is described. The UE includes a processor and memory in electronic communication with the processor. Instructions stored in the memory are executable to receive an uplink (UL) grant from a downlink control information. The instructions are also executable to determine a UL contention access region based on the UL grant. The instructions are further executable to determine clear channel assessment (CCA) timeslots in the UL contention access region. The instructions are additionally executable to perform UL contention access in the UL contention access region with a backoff process.

The UL contention access region may have a fixed length and location in a subframe. The CCA timeslots may be allocated from one end of the contention access region.

The CCA timeslots may be adjusted and aligned with other LAA UEs based on timing advance (TA) parameters of the UE itself and a maximum TA value signaled by an evolved node B (eNB). A contention window size of UL listen before talk (LBT) may be determined based on an available number of CCA timeslots in the UL contention access region.

The UL contention access may include a backoff counter that is generated randomly within a contention window size. The backoff counter may continuously count down regardless of channel status. If the backoff counter reaches 0, and if the channel status is idle, then the UE may transmit a UL LAA transmission as scheduled. If the backoff counter reaches 0, and if the channel status is not idle, then the UE may drop the scheduled UL LAA transmission.

A method for transmitting signals in a LAA serving cell by a UE is also described. The method includes receiving a UL grant from a downlink control information. The method also includes determining a UL contention access region based on the UL grant. The method further includes determining CCA timeslots in the UL contention access region. The method additionally includes performing UL contention access in the UL contention access region with a backoff process.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Licensed-Assisted Access (LAA) supports deployment of LTE in unlicensed spectrum. In a LAA network, the LAA subframe transmission is in an opportunistic manner. Thus, listen before talk (LBT) with clear channel assessment (CCA) is required before a LAA transmission in most regulatory domains. Downlink (DL)-only LAA was specified in LTE release-13. LAA can be operated in a TDD carrier. Frame structure type 3 is applicable to LAA secondary cell operation with normal cyclic prefix. In the frame structure type 3, the 10 subframes within a radio frame are available for downlink transmissions. Downlink transmissions occupy one or more consecutive subframes, starting anywhere within a subframe and ending with the last subframe either fully occupied or one of downlink pilot time slot (DwPTS) durations. The behaviors of uplink (UL) LAA are described herein.

A LTE UL transmission may be scheduled by an eNB with an uplink grant. A UL grant may be a DCI format in a physical downlink control channel (PDCCH) or enhanced PDCCH (EPDCCH), or Physical Hybrid ARQ Indicator Channel (PHICH) feedback. The time between a UL grant and the scheduled UL transmission is at least 4 milliseconds (ms). The eNB may schedule simultaneous UL transmissions from multiple UEs in a single subframe.

For a LAA uplink transmission, a UE needs to perform CCA detection and LBT before transmission. To support simultaneous UL transmissions from multiple UEs in the same timeslot, the CCA detection timeslot of UEs in the same LAA cell should be synchronized and aligned, and the same counter value may be used by these UEs. The systems and methods herein describe the CCA slot structure and counter methods and the CCA detection timing and backoff counter operations.

Since a UL transmission is scheduled by an eNB in advance with a UL grant, and should be transmitted in the scheduled subframe, a frame based equipment (FBE) method is suitable for LAA UL transmission. As described above, a LAA UL transmission is subjected to CCA detection and listen-before-talk (LBT). If a UE detects the channel is occupied before the scheduled UL transmission, the UE should backoff the scheduled transmission.

Several approaches may be used for contention access. In one approach, a single CCA sensing (e.g., 25 microseconds (μs) ICCA size sensing) may be performed before transmission. In another approach, a random backoff within a contention window size (CWS) may be performed. As used herein, "contention window size" is defined as the maximum value of a backoff counter. In other words, a backoff counter may be generated by selecting one value from the range of [0, CWS]. The systems and methods described herein provide mechanisms such that the number of available slots within the given contention access region is set to the same value as CWS.

In another approach, a random backoff with a counter indicated by eNB may be used. In yet another approach, there may be no LBT if the temporal gap between a DL and UL transmission is very small (e.g., less than 16 or 25 μs).

However, if only a single CCA detection before the scheduled transmission is used, the chance of channel access is reduced. On the other hand, if a random backoff process is used, the backoff counter may not be able to reduce to zero. In other words, a backoff process may not be completed in a channel access region.

The systems and methods herein describe approaches for CCA slot structure and alignment, as well as enhanced backoff mechanisms without continuous channel sensing. Some key points include synchronized CCA slot structure, contention window size determination, and CCA and backoff mechanisms.

The systems and methods herein further describe a backoff mechanism with continuous backoff count down and a single CCA sensing interval when the backoff counter expires. The benefits include guaranteed completion of the backoff process before scheduled UL transmission, enhanced channel access and fairness among LAA UEs, and support of simultaneous UL transmissions.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for contention access may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UL LAA contention access module 126.

The Licensed-Assisted Access (LAA) supports LTE in unlicensed spectrum. In a LAA network, the LAA subframe transmission occurs in an opportunistic manner. Thus, listen before talk (LBT) with clear channel assessment (CCA) is required before a LAA transmission. The DL-only LAA was specified in LTE release-13.

A LTE UL transmission may be scheduled by an eNB 160 with an uplink grant. A UL grant may be a DCI format in a PDCCH or EPDCCH, or PHICH feedback. The time between a UL grant and the scheduled UL transmission may be at least 4 ms. The eNB 160 may schedule simultaneous UL transmissions from multiple UEs 102 in a single subframe. For a scheduled UL transmission, the eNB 160 should make sure there is no conflict between a DL and a UL on the same LAA cell.

There are several approaches that may be implemented for UL LBT. The pros and cons of these approaches are described below. In a first approach, no LBT is performed if the temporal gap between a DL and UL is very small. In this approach, a UL transmission may happen without LBT if the gap between a DL and a UL is very small. However, this approach has many restrictions. First, the LAA DL transmission cannot avoid the hidden terminal issue, as described in connection with FIG. 3.

In a second restriction, the start time of the UL LAA should be known in advance or may be fixed. The ending time of a DL transmission should be known in advance. Furthermore, this approach only works for the first UL transmission after a DL LAA transmission, and cannot be used for other LAA UL transmissions. Additionally, the LAA DL burst should be last at least 4 ms in order to keep the association timing between the DL scheduling DCI and UL transmission. It is very difficult support variable length LAA transmissions and consecutive UL LAA transmissions. Therefore, although it is feasible in some cases for a LAA UL transmission without LBT when the gap is very small, this approach brings many restrictions and may be hard to justify.

However, in the case where there is no other present unlicensed network (e.g. WiFi or LAA cells from other operators), this approach may be applicable. Especially, if LAA patterns include LAA DL and LAA UL subframes are defined, this approach can be used.

In a second approach, a category 2 LBT may be performed before a scheduled transmission. Category 2 LBT only requires a single CCA sensing before transmission. This is also called frame based equipment (FBE) contention access. Category 2 LBT may make sense because a UL transmission is scheduled, and the UL transmission should be dropped if it cannot get the channel at scheduled time. Furthermore, this approach allows simultaneous UL transmission from multiple UEs 102 since they all sense the same CCA interval before transmission. An example of a category 2 UL LAA transmission is described in connection with FIG. 4.

To avoid potential interruption of WiFi transmission, the CCA sensing interval should have a length of a minimum defer duration ($T_d$), which includes duration $T_f=16$ us immediately followed by a slot duration of $T_{sl}=9$ us, and $T_f$ includes an idle slot duration $T_{sl}$ at the start of $T_f$. A slot duration $T_{sl}$ is considered to be idle if the eNB 160 senses the channel during the slot duration, and the power detected by the eNB 160 for at least 4 us within the slot duration is less than an energy detection threshold $X_{Thresh}$. Otherwise, the slot duration $T_{sl}$ is considered to be busy.

However, since the single CCA sensing is located at a fixed location in a subframe structure, it reduces the channel access probability and the chance to use another region for channel access. Therefore, although a category 2 LBT before scheduled transmission is possible, it is too restrictive on the LBT sensing and LAA transmission timing.

Similarly, in the case where there is no other present unlicensed network (e.g., WiFi or LAA cells from other operators), this approach may be used. If no other unlicensed network is present, the LAA eNB 160 scheduler should ensure there is no conflict between a LAA DL transmission and a LAA UL transmission. In this case, a single CCA detection before UL transmission should be sufficient.

In a third approach, category 4 LBT may be performed. With category 4 LBT, for a LAA uplink transmission, a UE 102 needs to perform CCA detection and a backoff process before transmission. The category 4 LBT includes a random backoff mechanism to give the UE 102 chances for contention access.

A category 4 LBT with random backoff is suitable for WiFi and LAA DL transmissions because the scheduling and transmissions are flexible. In a backoff procedure, the backoff counter may be suspended if the channel is busy. The contention window size may be adjusted based on the feedback of previous transmissions in an exponential backoff algorithm.

In some approaches for category 4-based UL LBT, a smaller contention window size may be used compared with DL LAA. Also, an eNB-signaled counter value may be used.

A LAA UL is scheduled in advance by a UL grant. The contention window size of a UL LBT can be much smaller than that of a DL LAA transmission. Furthermore, to support simultaneous UL transmissions from multiple UEs 102 in the same timeslot, the CCA detection timeslot of UEs 102 in the same LAA cell should be synchronized and aligned, and the same counter value may be used by these UEs 102. Thus, for UL LBT, the backoff counter may be generated by eNB 160 and signaled to UEs 102.

The HARQ-ACK feedback for a previous UL transmission may not be available or applicable for UL LAA transmissions. A fixed contention window size may be used. And the contention window sizes may be much smaller than the contention window size of DL LAA. The eNB-signaled counter value may be useful for simultaneous LAA UL transmissions from multiple UEs 102 in the same LAA cell.

Figure 5:
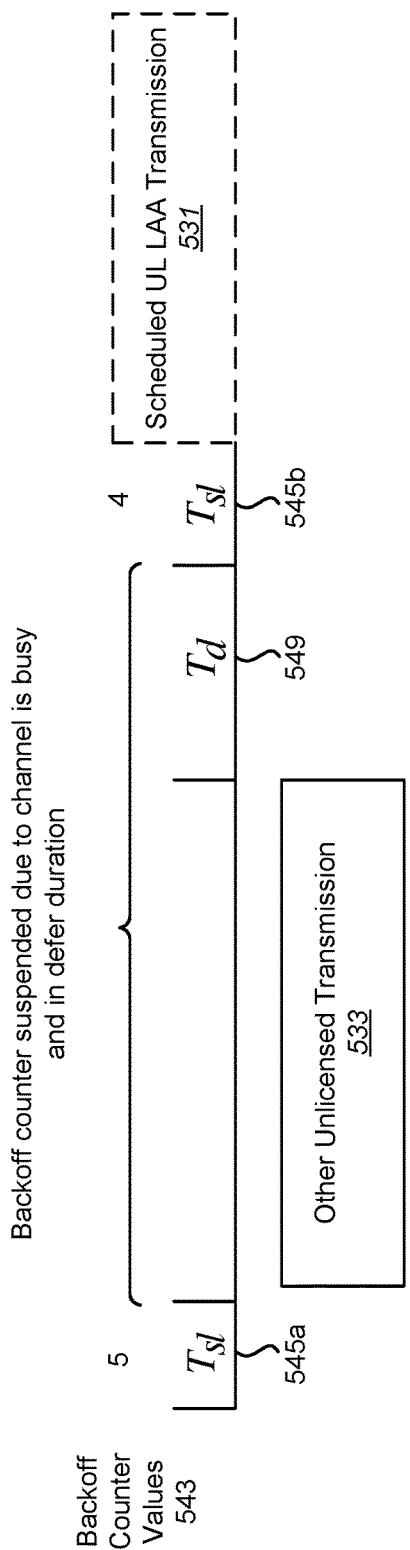
FIG. 5 illustrates an example of a backoff process that cannot complete before scheduled transmission timing.

However, for a LAA UL transmission with a backoff process based on CCA channel conditions, there are several issues. First, if the backoff counter is suspended when the channel is busy, the backoff process may not complete before the scheduled subframe transmission timing. FIG. 5 shows an example of this scenario.

Figure 6:
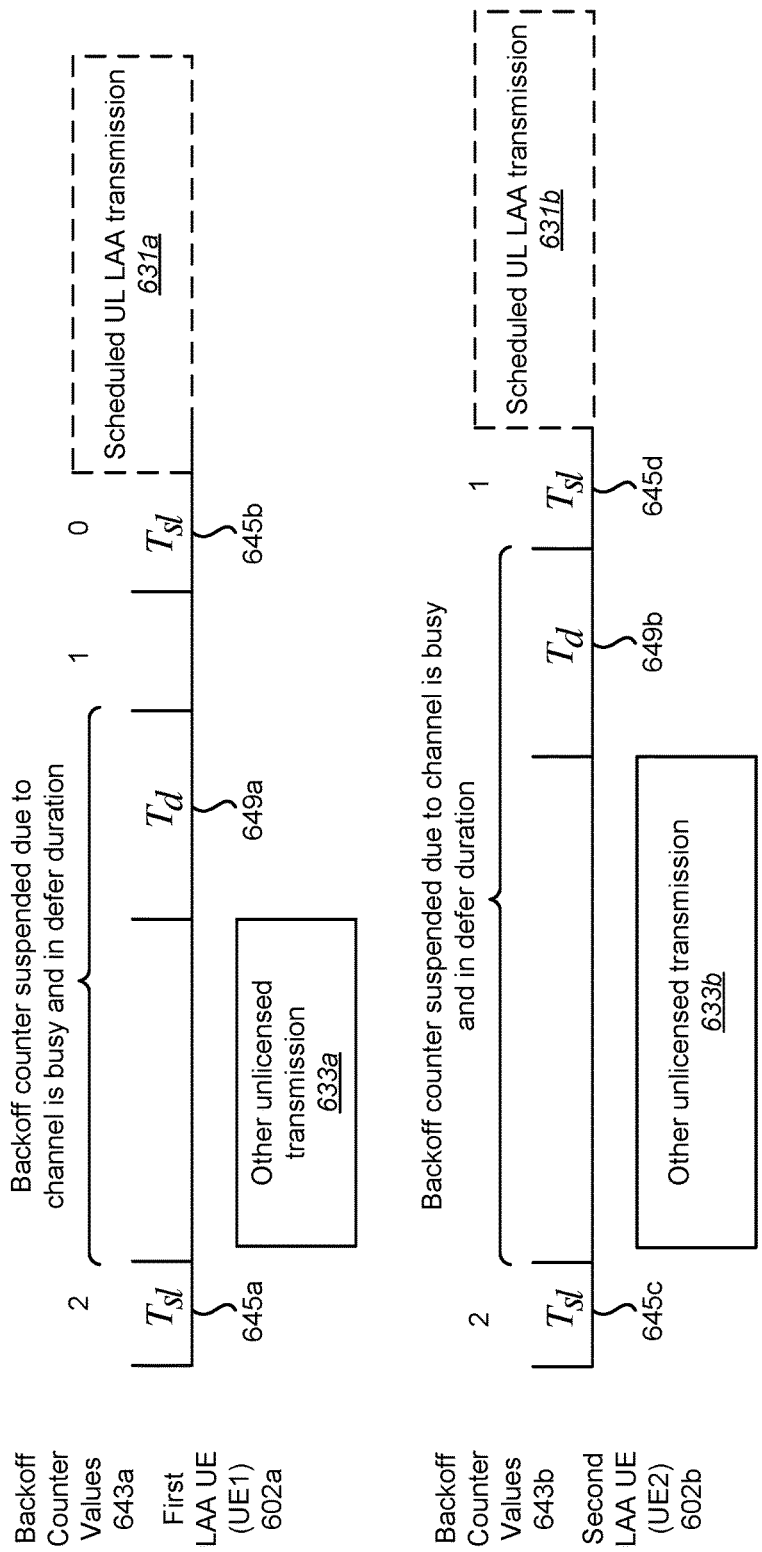
FIG. 6 is a diagram illustrating slot and backoff counter misalignment issues in UL LAA.

Furthermore, the channel status observed at different UEs 102 may be different. Thus, even if the same counter value is signaled to multiple UEs 102, the backoff counter values may become different due to different channel conditions observed at different UEs 102, and the backoff slots may not be aligned between different LAA UEs 102. Simultaneous UL LAA transmissions from multiple UEs 102 may not be possible because the UL LAA transmission of one LAA UE 102 with a counter that reaches 0 first will block the UL LAA transmission of another UE 102. Also, if the defer duration $T_d$ and slot duration of $T_{sl}=9$ us are defined the same way as in DL LAA, the slots of different UEs 102 may not be aligned together. FIG. 6 illustrates slot and counter misalignment issues in UL LAA category 4.

Based on the discussion of the existing approaches, it may be observed that UL transmission without LBT after a DL transmission has many limitations. UL LAA Category 2 LBT can be used if no other unlicensed access network (e.g., WiFi network) is present. The enhanced UL LAA category 4 may be used if another unlicensed access network (e.g., WiFi network) is present.

To overcome the issues mentioned above for existing LBT mechanisms, the systems and methods herein provide for enhanced category 4 LBT mechanisms for UL LAA considering the fixed timing requirements and fairness among UEs 102. The UL LBT mechanism should satisfy the following conditions. A fixed UL LAA contention access region and CCA slot should be specified or signaled before the scheduled UL LAA transmission timing. The backoff process can be completed in a given contention access region or gap period. If a backoff counter is signaled by the eNB 160, the counter value should be always synchronized at the LAA UEs 102 for simultaneous UL LAA transmissions. Fairness may be provided among LAA UEs 102, and more channel access probabilities compared with category 2 single CCA sensing methods.

To ensure that a backoff procedure always finishes before the scheduled subframe, the contention access region or gap period may be fixed or known in advance. The UL LAA contention access may be limited to a contention access region or a gap region. The contention access region may have a length of 1 OFDM symbol, or 2 OFDM symbols. The contention access region may be fixed or signaled by higher layer.

The LAA UL subframe structure may depend on the contention access region configuration. The contention window size also depends on the contention access region configuration. For example, if 1 OFDM symbol length is configured for the contention access region or gap period, a LAA UL transmission may remove the last OFDM symbol of a regular UL subframe. Thus, LAA UL data may always start with a UL subframe boundary. Alternatively, a LAA UL transmission may remove the first OFDM symbol of a regular UL subframe. Thus, LAA UL data may always end with a UL subframe boundary. If 2 OFDM symbols are configured for a contention access region or gap period, a LAA UL transmission may remove the first and the last OFDM symbols of a regular UL subframe.

The contention access region, the contention window size and the LAA UL subframe formats can be mutually dependent and determined either way. Thus, the eNB 160 can configure or signal the LAA UL subframe format, and the contention access region and the contention window size can be determined from the LAA UL subframe format. The eNB 160 can configure or signal the contention window size, the contention access region and LAA UL format can be determined from the LAA UL subframe format. The configuration and signaling can be performed at physical layer in a DCI, or a higher layer signaling, such as RRC signaling.

For a random backoff counter generated by a LAA eNB 160 or a LAA UE 102, the contention window (CW) size may be determined based on the length of contention access region. If a backoff counter is signaled by the eNB 160 to multiple UEs 102, the backoff counter values may be aligned with each other to allow simultaneous UL LAA transmissions from multiple UEs 102. To ensure the backoff alignment and the backoff process can be completed before the end of a contention access region, a modified backoff procedure may be used.

For the UL LBT backoff procedure, new approaches may be used that combine the benefits of category 2 and category 4 mechanisms. Similar to category 4, a random backoff counter may be generated for the LBT backoff procedure. In one case, the backoff counter is generated by the LAA UE 102 itself. In another case, the backoff counter is generated by eNB 160 and signaled to the UE 102. The second case is useful when multiple LAA UL transmissions are scheduled in the same subframe. Similar to category 2, the channel access can be determined based on a single CCA detection result when the backoff counter becomes 0.

Two approaches may be used based on whether a LAA UE 102 needs to sense the channel continuously or not. In a first approach (Approach 1), the LAA UE 102 continuously senses the channel and counts down the backoff counter regardless of the channel condition. In LAA DL backoff, if the channel is sensed as busy or in a defer duration, the backoff counter is suspended or frozen. After a busy channel, the channel should be idle for a defer duration before the backoff counter count down resumes. To maintain the synchronization of counter values and CCA slots for simultaneous UL transmissions, in the proposed LAA UL backoff, the LAA UE 102 continuously senses the channel and counts down the backoff counter regardless of the channel condition.

A LAA UL can be transmitted only if the channel condition is idle when the backoff counter reaches 0. As described above, the channel condition is idle if the channel is sensed idle for at least a duration of a minimum defer duration $T_d$ which includes a $T_f$=16 us immediately followed by a slot duration of $T_{sl}$=9 us, and $T_f$ includes an idle slot duration $T_{sl}$ at the start of $T_f$. A slot duration $T_{sl}$ is considered to be idle if the eNB 160 senses the channel during the slot duration, and the power detected by the eNB 160 for at least 4 us within the slot duration is less than energy detection threshold $X_{Thresh}$. Otherwise, the slot duration $T_{sl}$ is considered to be busy.

Thus, the channel state is considered as busy if the power detected by the eNB 160 in any 4 us within the slot duration is greater than energy detection threshold $X_{Thresh}$, and if it is within a defer duration after the channel is busy. The channel is considered as idle if the power detected by the eNB 160 in any 4 us within the duration of $T_f$+$T_{sl}$ is less than energy detection threshold $X_{Thresh}$ when the backoff counter reaches 0.

The LAA UE 102 can transmit the scheduled LAA UL if the channel is in idle state when the backoff counter reaches 0. If the channel state is not idle, the LAA UE 102 should give up the LAA UL transmission.

Figure 7:
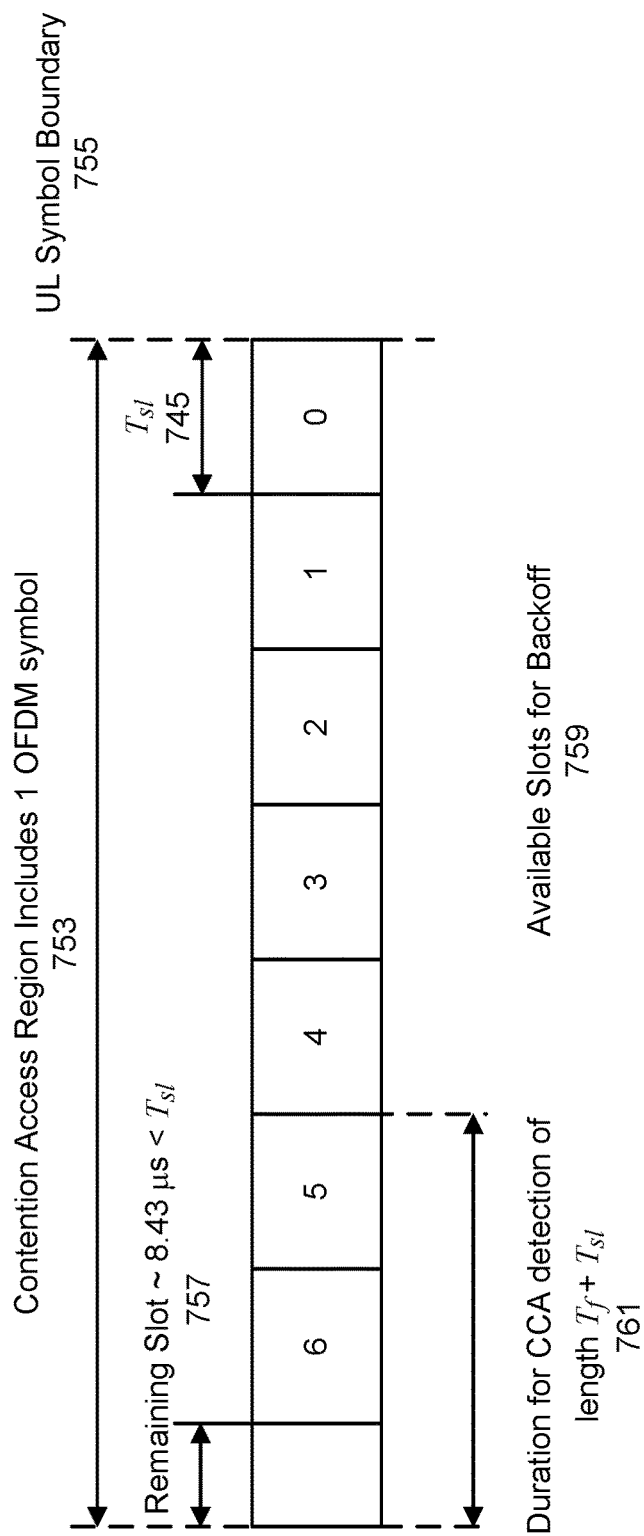
FIG. 7 is a diagram illustrating a clear channel assessment (CCA) slot structure for UL LAA with a contention access region length of 1 orthogonal frequency division multiplexing (OFDM) symbol.
Figure 8:
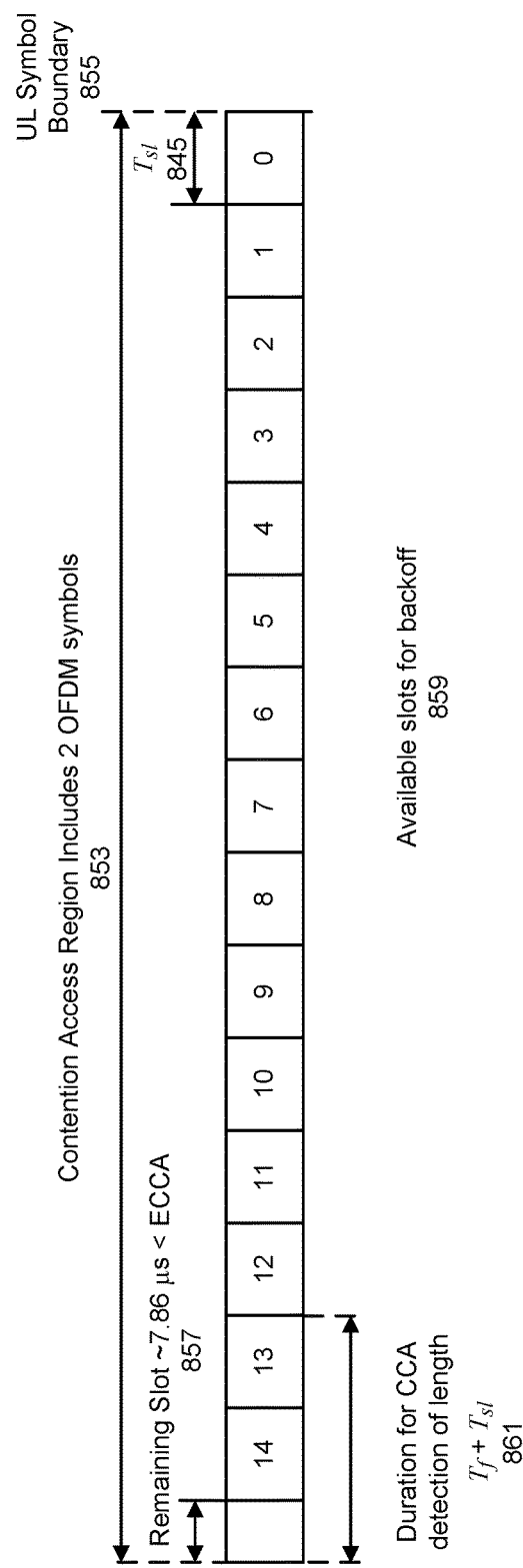
FIG. 8 is a diagram illustrating a CCA slot structure for UL LAA with a contention access region length of 2 OFDM symbols.
Figure 9:
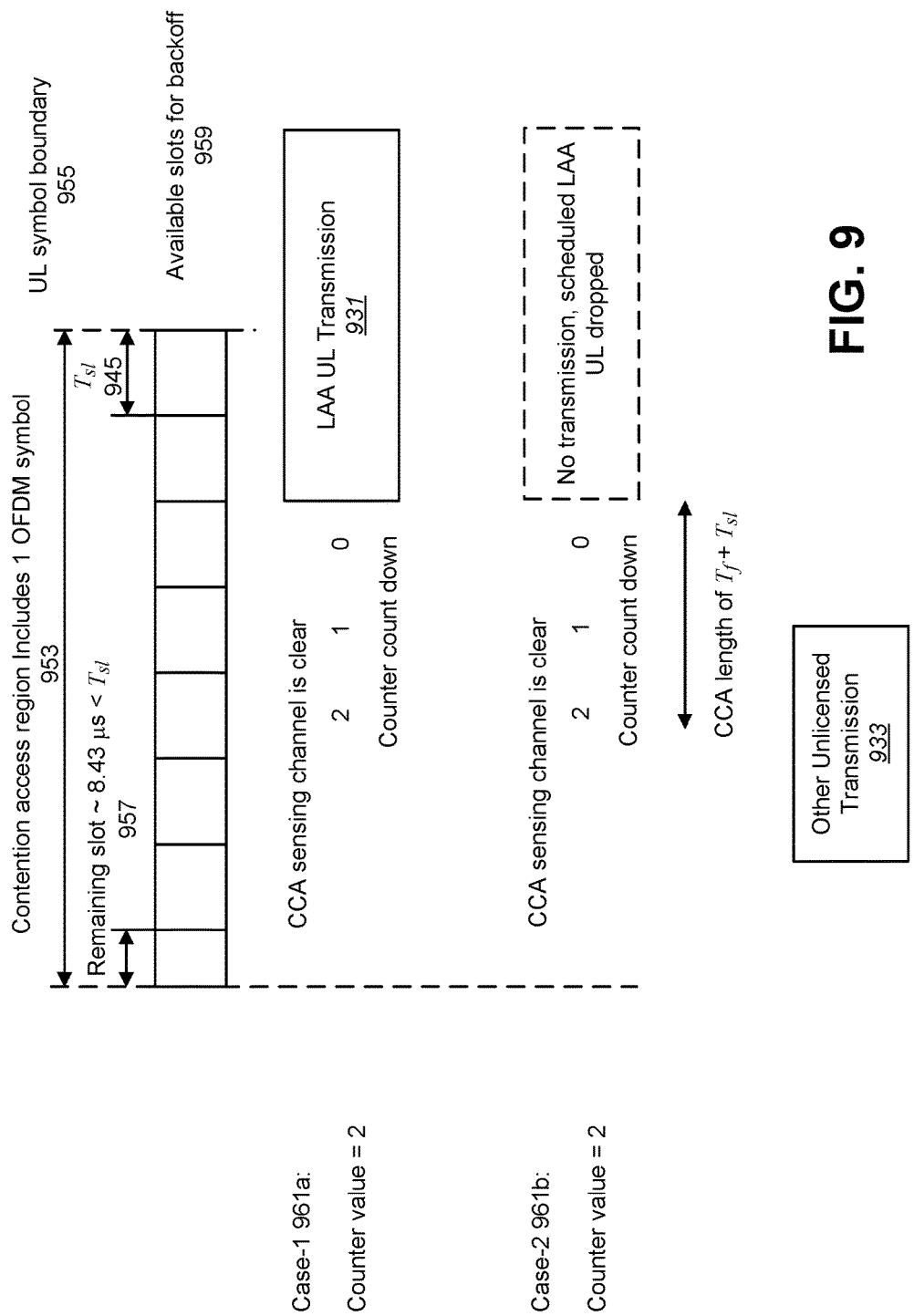
FIG. 9 is a diagram illustrating examples of UL LAA operation.

A CCA slot structure can be defined with a basic short slot of duration $T_{sl}$=9 us. FIG. 7 shows an example where a contention access region has a length of 1 OFDM symbol. FIG. 8 shows an example where the contention access region has a length of 2 OFDM symbols. FIG. 9 shows two examples of Approach 1 in operation.

In a second approach (Approach 2), there is no continuous channel sensing, and a single CCA sensing is performed when the backoff counter expires. With Approach 1, even if the counter value is decreased regardless of channel condition, the UE 102 still needs to perform CCA detection and monitor the channel state all the time. In Approach 2, to reduce the complexity of UE 102 operation, the UE 102 may perform a single CCA detection duration before a UL LAA transmission when the backoff counter becomes zero.

With a fixed CCA slot structure, the backoff counter is a value to indicate a position in the CCA slot structure where CCA detection should be performed. Depending on whether the CCA detection is performed before or after the backoff counter becomes zero, the CCA slot structure may be slightly different.

If the CCA detection is performed before the counter becomes zero, the same slot structure as in Approach 1 can be applied. The UE 102 should start performing CCA detection $T_f$+$T_{sl}$ before the counter becomes 0. The UE 102 may determine whether to transmit or drop the scheduled LAA UL based on the CCA detection result during the length of $T_f$+$T_{sl}$. In this case, the available $T_f$ slots for contention access are the same as in Approach 1. In other words, the contention window size should be 5 if the contention access region has a length of 1 OFDM symbol, and 13 if the contention access region has a length of 2 OFDM symbols. To provide more randomness for channel access, the contention window size can be defined without reserving all the slots required for a duration of $T_f$+$T_{sl}$=25 μs in the contention access region. Thus, the contention window size may be set as 7 if the contention access region has a length of 1 OFDM symbol, and 15 if the contention access region has a length of 2 OFDM symbols.

Figure 10:
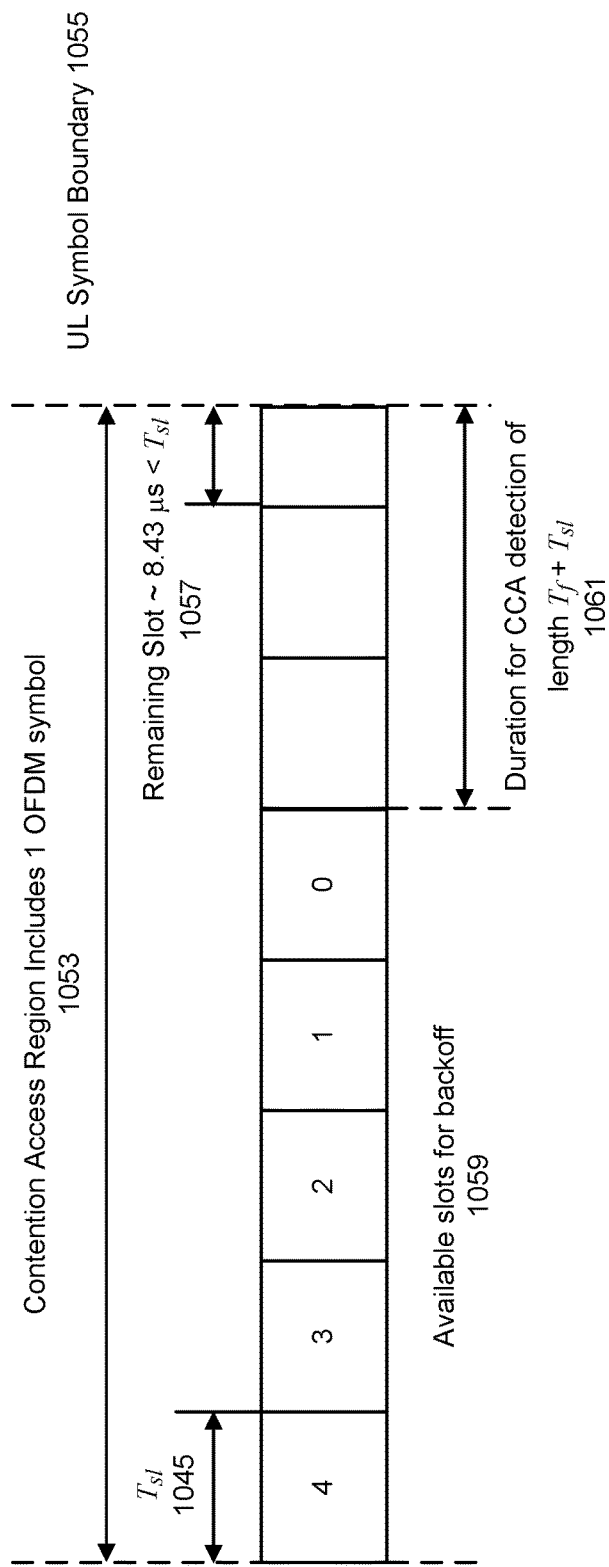
FIG. 10 is a diagram illustrating another CCA slot structure for UL LAA with a contention access region length of 1 OFDM symbol.
Figure 11:
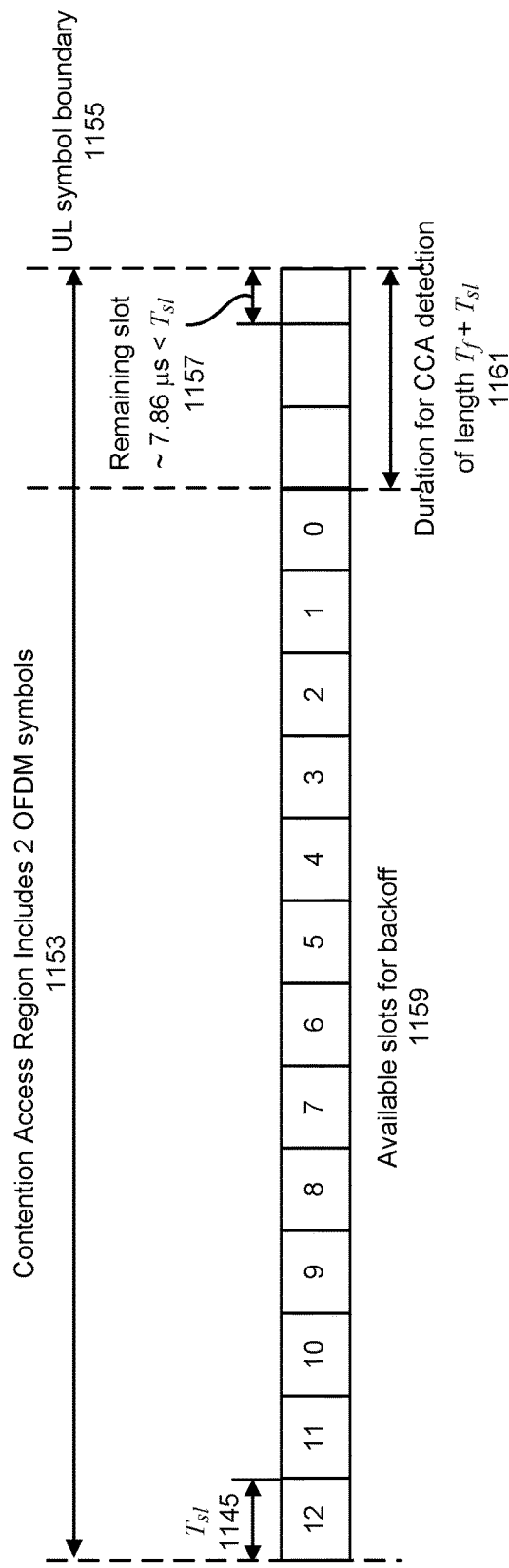
FIG. 11 is a diagram illustrating another CCA slot structure for UL LAA with contention access region length of 2 OFDM symbols.

If the CCA detection is performed after the counter becomes zero, the $T_f$ slot should start immediately in the contention access region, and two $T_f$ slots and the remaining slot with shorter length should be reserved at the end of the contention access region. The UE 102 should start performing CCA detection in a length of $T_f+T_{sl}$ after the counter becomes 0. The UE 102 may determine whether to transmit or drop the scheduled LAA UL based on the CCA detection result during the length of $T_f+T_{sl}$. FIG. 10 and FIG. 11 show the slot structure for the contention access region length of 1 and 2 OFDM symbols respectively if the CCA detection is performed after the backoff counter becomes zero.

In case the CCA detection is performed after the counter reaches 0, the available $T_f$ slots for contention access should exclude the reserved time for a duration of at least $T_f+T_{sl}$. Thus, the contention window size may be 5 if the contention access region has a length of 1 OFDM symbol, and 13 if the contention access region has a length of 2 OFDM symbols.

With Approach 2, the backoff counter may be implemented in two ways. In one implementation, the backoff counter is the number of slots to be waited in the contention access region, similar to Approach 1. In another implementation, the backoff counter is the $T_{sl}$ slot index number in the CCA structure of the contention access region.

For both Approach 1 and Approach 2, the contention window size may be determined based on the available number of $T_f$ slots in a contention access region. The backoff counter may be generated randomly within contention window, and the backoff counter counts down continuously regardless of channel status. The backoff process may be completed within the contention access region with a single chance of channel access.

Compared with category 2 where a single CCA sensing is performed at a fixed location, the described approaches (i.e., Approach 1 and Approach 2) provide better randomness on the channel access. In DL LAA category 4, the backoff counter can be suspended and resumed based on CCA detection results. Also, the contention window size may be changed based on HARQ-ACK feedback information. Compared with DL LAA category 4, the described approaches are much simpler because the counter handling is not dependent on channel status and the backoff process is guaranteed to finish within a contention access region.

To avoid interruption of an ongoing WiFi packet exchange, the minimum required sensing duration $T_f$ may be the same as the length of a Short Interframe Space (SIFS) in WiFi. For simpler CCA detection, in both Approach 1 and Approach 2, the sensing interval for idle state determination before LAA UL transmission may be defined as a number of continuous $T_f$ slots. The minimum number of continuous $T_f$ slots required for CCA detection before UL LAA transmission is 2, which results in an 18 μs duration that is longer than SIFS in WiFi. Alternatively, 3 continuous $T_f$ slots can be used for CCA detection before UL LAA transmission, which results in a 27 μs duration, slightly longer than $T_f+T_{sl}$.

It should be noted that the remaining shorter slot is only slightly shorter than $T_f$, and can be treated as a $T_f$ slot. If only 2 continuous $T_f$ slots are used for CCA detection before LAA UL transmission, the contention window size for a contention access region with a length of 1 symbol will be 6 instead of 5. The contention window size for a contention access region with a length of 2 symbols will be 14 instead of 13.

For a LAA eNB 160, if a subframe n on a LAA carrier is scheduled for UL transmission, the eNB 160 should not schedule any DL transmission on subframe n. Furthermore, there should be a minimum gap for CCA detection before the scheduled UL transmission. For example, the eNB 160 should not schedule PDSCH transmissions on all OFDM symbols of in the LAA cell subframe n−1. That is, the eNB scheduler can avoid collision between a LAA DL and a LAA UL transmission in the same LAA cell.

As discussed above, the CCA slots should be fixed or known to all LAA UEs 102 in the contention access region, and a common backoff counter may be signaled by the eNB 160 to multiple LAA UEs 102 for simultaneous UL transmissions. The CCA slot structure given in above Approach 1 and Approach 2 can satisfy the requirement if the UEs 102 have aligned CCA slots and OFDM/SC-FDMA symbol boundaries.

However, if different UEs 102 have different timing advance (TA) values, the UL symbol and subframe boundary of the different UEs 102 are shifted by the TA values, and are no longer aligned. Consequently, the $T_{sl}$ length backoff slots may not be aligned either. With the TA difference, it is possible that one UE 102 starts UL LAA transmission first, and other UEs 102 detect the transmission and drop the scheduled UL LAA transmission even if the eNB 160 schedules simultaneous transmissions from these UEs 102. Therefore, some mechanisms to solve different TA values may be employed to enhance the robustness of UL LAA operations.

Figure 12:
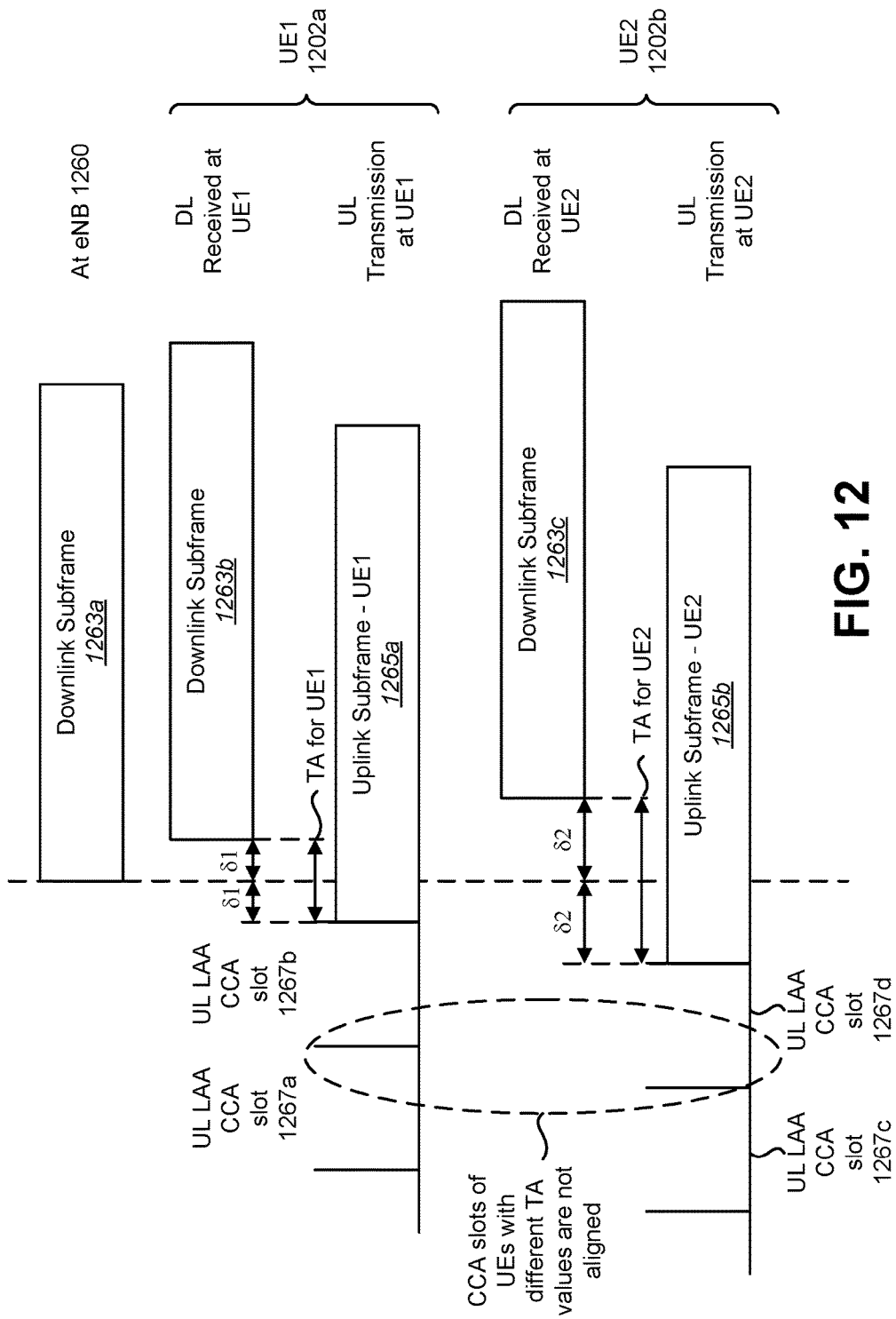
FIG. 12 illustrates an example of a UE timing advance (TA) and UL LAA backoff slot alignment issue.

LTE has a synchronized subframe structure. To maintain the subframe and symbol level synchronization, for a UL transmission, a timing advance (TA) may be applied at the UE 102 to offset the propagation delay between the eNB 160 and the UE 102. Timing advance is a negative offset at the UE 102, between the start of a received downlink subframe and a transmitted uplink subframe. Furthermore, the eNB 160 may schedule multiple UL transmissions from multiple UEs 102 and the TA values at the different UEs 102 may be different. The TA values at different UEs 102 ensure the UL signals received at the eNB 160 are aligned together and synchronized with the subframe structure. FIG. 12 shows an example of different TA values at different UEs 102 with different distances to the eNB 160.

To align CCA slots of UEs 102 with different TA values, the eNB 160 may signal a maximum TA value to the LAA UEs 102 in the LAA cell. The maximum TA value (TAmax) can be signaled by eNB 160 as $N_{TA\_max}$, expressed in units of $T_S$. The CCA slots are aligned at the UEs 102 based on its own TA value and the signaled maximum TA value. This allows synchronized UL CCA slots among UEs 102.

Figure 13:
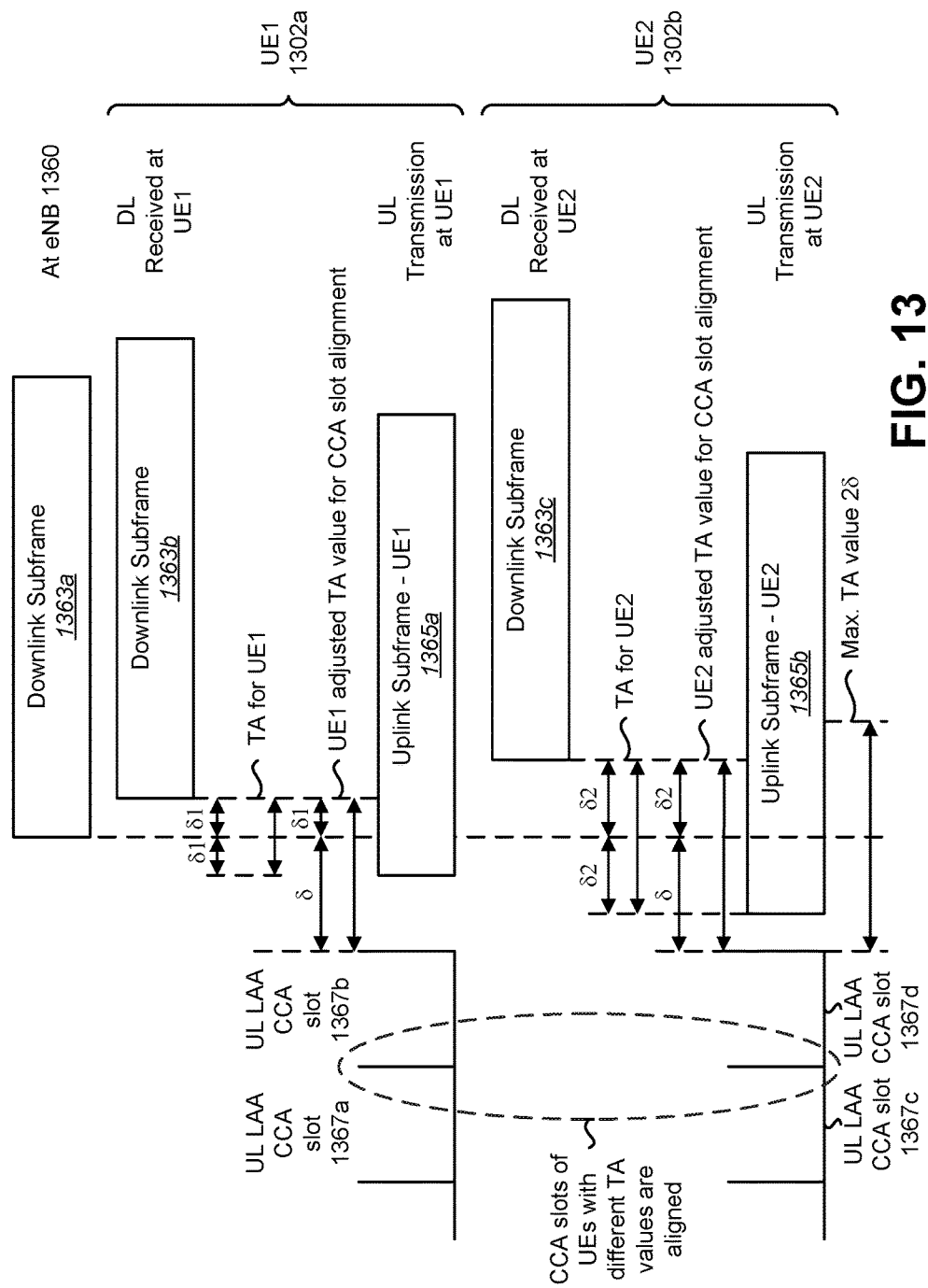
FIG. 13 illustrates an example of TA adjustment for UL CCA slot alignment.

The CCA slots are aligned with the adjusted TA value of a UE is given by Equation (1). FIG. 13 shows an example of TA adjustment for CCA slot alignment.

$$TA\_adjusted=(TA+TAmax)/2. \qquad (1)$$

If a LAA UE 102 obtains the channel in a UL LAA slot, it may start transmission with some kind of reservation signal before the scheduled UL LAA subframe boundary. The LAA UL subframe may be based on the UL LAA format configuration, and may be transmitted with the TA value of the given LAA UE 102. Some signal should be transmitted in the gap between the adjusted TA and the actual TA. For example, the signal in the gap period can be some further extended CP of the first symbol of actual UL LAA subframe, or the signal in the gap period can be an extension of the reservation signal.

The TA adjustment may ensure all LAA UEs 102 perform CCA detection with the same synchronized CCA slot timing. But this brings some extra complexity for UE 102 implementation. In some cases, the TA difference may be ignored if the value is very small. The timing advance at a UE 102 is based on the propagation delay. Since LAA cell is targeted for small cells (e.g., with a coverage less or equal to 100 meters), the propagation delay may be very small and less than 1 microsecond (1 microsecond=300 meters at the speed of light).

If the TA difference is ignored, the UL CCA slots of a UE 102 may be based on the TA value of the UE 102 itself. Thus, the CCA slots of different LAA UEs 102 may be slightly different due to different TA values. If the difference is very small (e.g., much shorter than the minimum sensing period of 4 us for CCA detection), a transmission that starts at one UE 102 may not block another UE 102 to transmit at the same CCA slot boundary.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of a UL LAA contention access module 194.

The UL LAA contention access module 194 may perform UL LAA contention access operations. This may be accomplished as described above.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
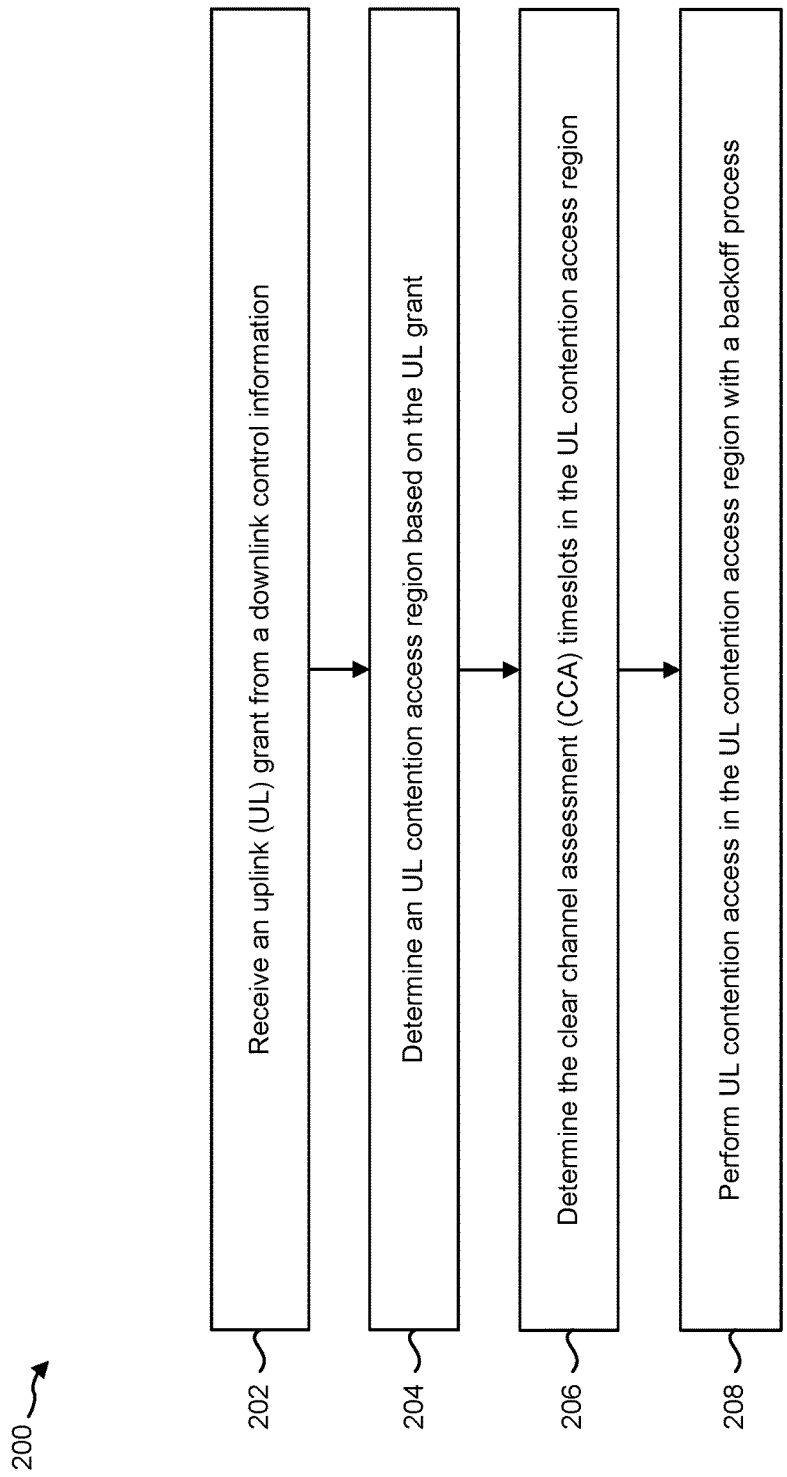
FIG. 2 is a flow diagram illustrating a method for performing uplink (UL) licensed-assisted access (LAA) contention access by a UE.

FIG. 2 is a flow diagram illustrating a method 200 for performing uplink licensed-assisted access (LAA) contention access by a UE 102. The UE 102 may communicate with one or more eNBs 160 in a wireless communication network. In one implementation, the wireless communication network may include an LTE network.

The UE 102 may receive 202 an uplink (UL) grant from a downlink control information (DCI). A UL grant may be a DCI format in a PDCCH or EPDCCH, or PHICH feedback.

The UE 102 may determine 204 a UL contention access region based on the UL grant. The UL contention access region may have a fixed length and location in a subframe. A fixed UL LAA contention access region and CCA slot may be specified or signaled before the scheduled UL LAA transmission timing. For example, an eNB 160 can configure or signal the LAA UL subframe format, and the UL contention access region and the contention window size can be determined from the LAA UL subframe format.

The UE 102 may determine 206 clear channel assessment (CCA) timeslots in the UL contention access region. The CCA timeslots may be allocated from one end of the contention access region. The CCA timeslots may be adjusted and aligned with other LAA UEs based on timing advance (TA) parameters of the UE 102 itself and a maximum TA value signaled by the eNB 160. The contention window size of UL listen before talk (LBT) may be determined based on an available number of CCA timeslots in the UL contention access region.

The UE 102 may perform 208 UL contention access in the UL contention access region with a backoff process. The UL contention access may include a backoff counter that is generated randomly within the contention window size. The backoff counter may continuously count down regardless of channel status.

If the backoff counter reaches 0, and if the channel status is idle, then the UE 102 may transmit a UL LAA transmission as scheduled. If the backoff counter reaches 0, and if the channel status is not idle, then the UE 102 may drop a scheduled UL LAA transmission.

Figure 3:
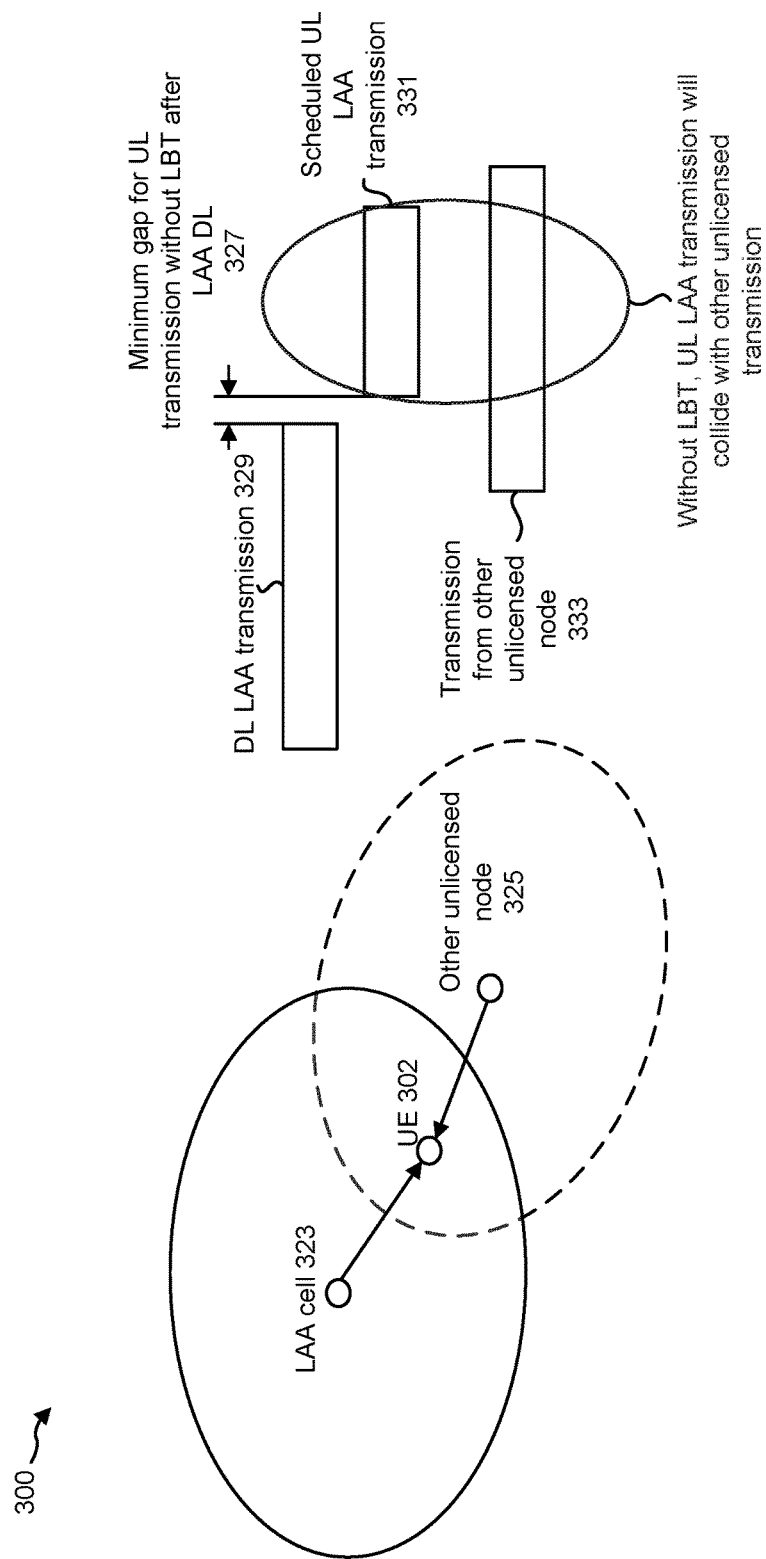
FIG. 3 illustrates the hidden node problem for uplink (UL) transmission without listen before talk (LBT)

FIG. 3 illustrates the hidden node problem for UL transmission without LBT. In FIG. 3, a UE 302 may be in range of an LAA cell 323 (e.g., an eNB 160) and another unlicensed node 325. The other unlicensed node 325 is out of range of the LAA cell. Therefore, it may be considered a hidden node (also referred to as a hidden terminal).

An LAA DL transmission cannot avoid the hidden node issue observed at a UE 302 because the channel observed at the eNB 160 and the UE 302 may be different. The LAA cell 323 may send a DL LAA transmission 329 followed by the minimum gap 327 for a UL transmission without LBT.

The UE 302 may have a scheduled UL LAA transmission 331. However, there may be other unlicensed transmissions 333 near the UE 302 that are not detected by the LAA eNB 160. If the UE 302 transmits without sensing, it will cause collision to an ongoing unlicensed transmission 333.

Figure 4:
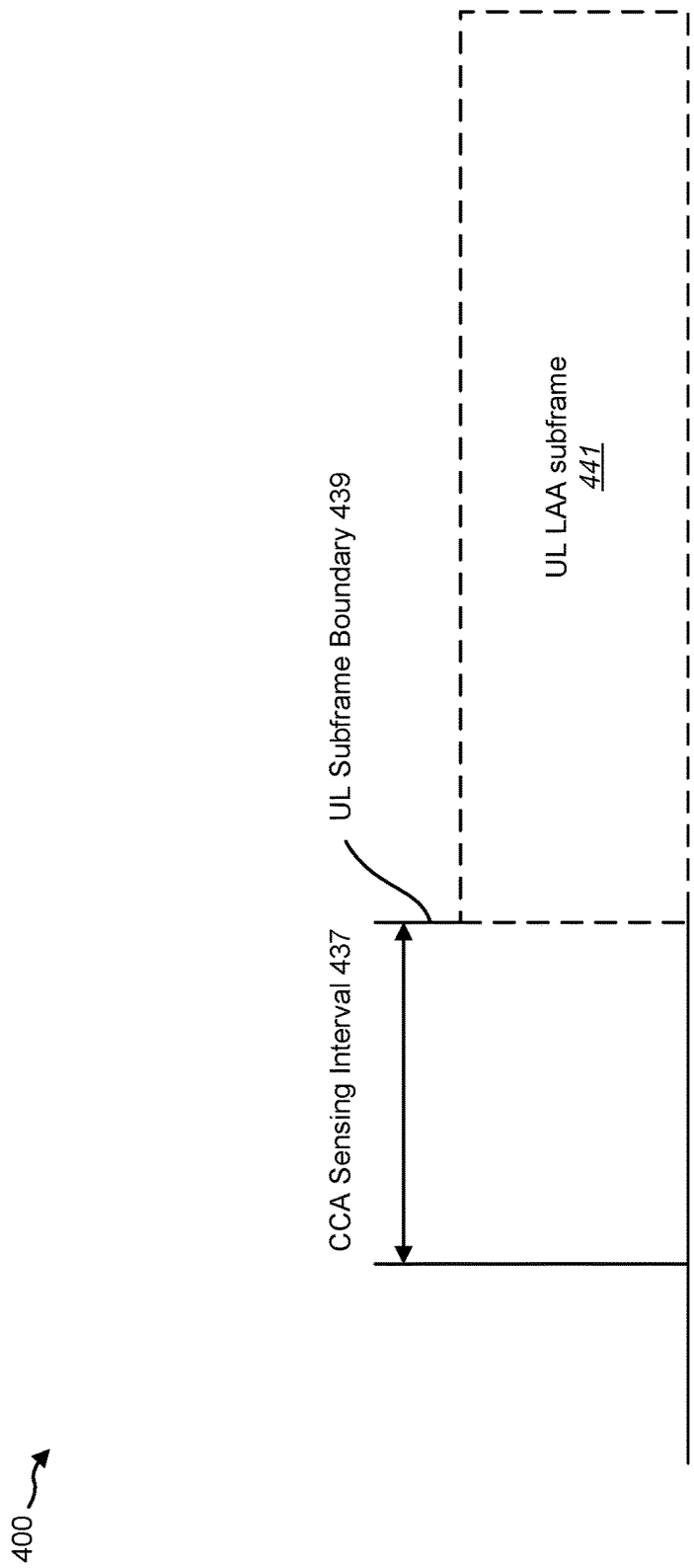
FIG. 4 is a diagram illustrating a category 2 UL LAA transmission.

FIG. 4 is a diagram illustrating a category 2 UL LAA transmission. The category 2 LBT may be performed before a scheduled UL transmission. Category 2 LBT only requires a single CCA sensing before transmission. This may occur in a CCA sensing interval 437 that precedes the UL subframe boundary 439. This is also called frame based equipment (FBE) contention access.

As shown in FIG. 4, a scheduled LAA UE 102 performs CCA detection in a single CCA sensing interval 437 upon the scheduled UL subframe boundary 439. If the channel is idle, the LAA UE 102 can transmit the LAA UL subframe 441 as scheduled. Otherwise, the UL transmission is dropped.

FIG. 5 illustrates an example of a backoff process that cannot complete before scheduled transmission timing. The backoff process may be performed by a UE 102. In FIG. 5, backoff counter values 543 are shown for a scheduled UL LAA transmission 531. When the backoff counter equals 5, there is a slot duration $T_{sl}$ 545a. When the UE 102 senses another unlicensed transmission 533, the backoff counter may be suspended for the duration of the other unlicensed transmission 533 followed by a defer duration $T_d$ 549. The backoff counter may resume with a backoff counter value 543 of 4 and a slot duration $T_{sl}$ 545b.

The scheduled UL LAA transmission 531 cannot start because the backoff counter is not zero yet. Also, continuing contention access in a later subframe may not be suitable for a UL scheduled for an earlier subframe. The UL transmission scheduled in advance is associated with a DL DCI. If the UL transmission is postponed due to the channel being busy, the existing association timing will be broken.

FIG. 6 is a diagram illustrating slot and backoff counter misalignment issues in UL LAA. Specifically, these issues are associated with UL LAA category 4. FIG. 6 shows the timing for a scheduled UL LAA transmission 631a of a first LAA UE 602a and a scheduled UL LAA transmission 631b of a second LAA UE 602b. The backoff counter values 643a,b are shown for an associated scheduled UL LAA transmission 631a,b.

The first LAA UE 602a and second LAA UE 602b are given the same backoff counter values 631a,b and aligned at the beginning. When the backoff counter equals 2, there is a slot duration $T_{sl}$ 645a,c. Each of the UEs 602a,b detects an unlicensed transmission 633. The first LAA UE 602a detects a first unlicensed transmission 633a and the second LAA UE 602b detects a second unlicensed transmission 633b.

The backoff counters may be suspended for the duration of the other unlicensed transmissions 633a,b followed by a defer duration $T_d$ 649a,b. However, due to the different channel conditions observed at the different LAA UEs 602a,b (i.e., the different lengths of the first and second unlicensed transmissions 633a,b), the CAA slots become misaligned, and the backoff counters become different.

The backoff counters may resume followed by a slot duration $T_{sl}$ 645b,d. In this case, the backoff counter value 643a for the first LAA UE 602a reaches 0, but the backoff counter value 643b for the first LAA UE 602a only reaches 1. Therefore, the slots and backoff counters are misaligned.

FIG. 7 is a diagram illustrating a CCA slot structure for UL LAA with a contention access region 753 length of 1 OFDM symbol. The $T_{sl}$ slots 745 may be divided from the end of an OFDM symbol aligned with the UL symbol boundary 755. One symbol length includes 7 slots with length of $T_{sl}$ 745 and a remaining slot 757 that is slightly smaller than $T_{sl}$ 745. This example corresponds to the first approach (Approach 1) described in connection with FIG. 1.

Since a duration 761 of $T_f + T_{sl} = 25$ µs is required to determine an idle channel state, the length of two $T_{sl}$ 745 slots and the remaining slot 757 (with a total length of ~26.43 µs) may not be counted in the backoff procedure to ensure the backoff can be completed within a given contention access region 753. Thus, the contention window size (which is equal to the number of available slots for backoff 759) should be 5, and the backoff counter can be generated by the UE 102 or signaled by the eNB 160 within the range of 0 to 4.

It should be noted that with the starting slots reserved for channel sensing, the contention window size is reduced, and the UL LAA cannot start at the beginning of a contention access region 753. Since a LAA UE 102 (in Approach 1) continuously senses the channel when it is not transmitting, the channel status is known at the beginning of the contention access region 753.

To provide more randomness for channel access, the contention window size can be defined without reserving all the slots required for a duration of $T_f + T_{sl} = 25$ µs in the contention access region 753. Thus, the contention window size may be set as 7, and the backoff counter can be generated by the UE 102 or signaled by the eNB 160 within the range of 0 to 6.

FIG. 8 is a diagram illustrating a CCA slot structure for UL LAA with a contention access region 853 length of 2 OFDM symbols. The $T_{sl}$ slots 845 may be divided from the end of an OFDM symbol aligned with the UL symbol boundary 855. One symbol length includes 15 slots with length of $T_{sl}$ 845 and a remaining slot 857 that is slightly smaller than $T_{sl}$ 845. This example corresponds to the first approach (Approach 1) described in connection with FIG. 1.

Since a duration 861 of $T_f + T_{sl}$ is required to determine an idle channel state, the length of two $T_{sl}$ slots 845 and the remaining slot 857 (with a total length of ~25.86 µs) may not be counted in the backoff procedure to ensure the backoff can be completed within a given contention access region 853. Thus, the contention window size (which is equal to the number of available slots for backoff 859) should be 13, and the backoff counter can be generated by the UE 102 or signaled by the eNB 160 within the range of 0 to 12.

As described in connection with FIG. 7, to provide more randomness for channel access, the contention window size can be defined without reserving all the slots required for a duration of $T_f + T_{sl} = 25$ µs in the contention access region 853. Thus, the contention window size may be set as 15, and the backoff counter can be generated by the UE 102 or signaled by the eNB 160 within the range of 0 to 14.

FIG. 9 is a diagram illustrating examples of UL LAA operation. These examples correspond to the first approach (Approach 1) described in connection with FIG. 1.

In these examples, the contention access region 953 has a length of 1 OFDM symbol. The $T_{sl}$ slots 945 may be divided from the end of an OFDM symbol aligned with the UL symbol boundary 955. One symbol length includes 7 slots with length of $T_{sl}$ 945 and a remaining slot 957 that is slightly smaller than $T_{sl}$ 945. All of the slots within the contention access region 953 are available for backoff 959.

In case-1 961a, the counter has an initial value of 2. When the counter reaches 0, the channel is still in idle condition. In other words, the UE 102 has not sensed another unlicensed transmission 933. The LAA UL transmission 931 may be transmitted. There may also be a reservation signal before the scheduled UL subframe structure.

In case-2 961b, the counter has an initial value of 2. In this case 961b, the LAA UE 102 detects some other unlicensed transmission 933 within the length of $T_f + T_{sl}$ before the counter becomes 0. Thus, the LAA UE 102 may not transmit and drops the scheduled UL LAA subframe.

FIG. 10 is a diagram illustrating another CCA slot structure for UL LAA with a contention access region 1053 length of 1 OFDM symbol. The $T_{sl}$ slots 1045 may be divided from the beginning of an OFDM symbol. One symbol length includes 7 slots with length of $T_{sl}$ 1045. A remaining slot 1057 that is slightly smaller than $T_{sl}$ 1045 is aligned with the UL symbol boundary 1055. This example corresponds to the second approach (Approach 2) described in connection with FIG. 1.

Since a duration 1061 of $T_f + T_{sl} = 25$ µs is required to determine an idle channel state, the length of two $T_{sl}$ 1045 slots and the remaining slot 1057 (with a total length of ~26.43 µs) may not be counted in the backoff procedure to ensure the backoff can be completed within a given contention access region 1053. Thus, the contention window size (which is equal to the number of available slots for backoff 1059) should be 5, and the backoff counter can be generated by the UE 102 or signaled by the eNB 160 within the range of 0 to 4.

FIG. 11 is a diagram illustrating another CCA slot structure for UL LAA with contention access region 1153 length of 2 OFDM symbols. The $T_{sl}$ slots 1145 may be divided from the beginning of an OFDM symbol. One symbol length includes 15 slots with length of $T_{sl}$ 1145. A remaining slot 1157 that is slightly smaller than $T_{sl}$ 1145 is aligned with the UL symbol boundary 1155. This example corresponds to the second approach (Approach 2) described in connection with FIG. 1.

Since a duration 1161 of $T_f + T_{sl}$ is required to determine an idle channel state, the length of two $T_{sl}$ slots 1145 and the remaining slot 1157 (with a total length of ~25.86 µs) may not be counted in the backoff procedure to ensure the backoff can be completed within a given contention access region 1153. Thus, the contention window size (which is equal to the number of available slots for backoff 1159) should be 13, and the backoff counter can be generated by the UE 102 or signaled by the eNB 160 within the range of 0 to 12.

FIG. 12 illustrates an example of a UE timing advance (TA) and UL LAA backoff slot alignment issue. This example includes an eNB 1260, a first UE (UE1) 1202a and a second UE (UE2) 1202b. The UEs 1202 have different TA values and different distances to the eNB 1260.

The eNB 1260 may send a downlink subframe 1263a. The first UE 1202a receives the downlink subframe 1263b and the second UE 1202b receives the downlink subframe 1263c. The first UE 1202a sends an uplink subframe 1265a and the second UE 1202b sends an uplink subframe 1265b.

In this example, UE1 1202a is located close to the eNB 1260 and UE2 1202b is located far from the eNB 1260. Thus, UE2 1202b has a larger propagation delay, and its uplink transmission 1265b is somewhat in advance as compared to that of the UE1 1202a.

Let δ1 be the propagation delay experienced on the downlink for UE1 1202a and δ2 is the propagation delay experienced on the downlink for UE2 1202b. Since UE2 1202b is located far from the eNB 1260 as compared to UE1 1202a, δ2>δ1. Also, eNB 1260 transmits the downlink subframe 1263a at time t1 which is seen by UE1 1202a at time t1+δ1 and UE2 1202b at time t1+δ2. Both UE1 1202a and UE2 1202b take the downlink subframe 1263 arrival (together with timing advance) as a reference to calculate uplink subframe 1265 timing.

The timing advance is equal to 2× propagation delay assuming that the same propagation delay value applies to both downlink and uplink directions. Therefore, UE1 1202a needs to start its uplink at t1−2δ1, whereas UE2 1202b should start its uplink at t1−2δ2. This will ensure that both of the uplink transmissions (from UE1 1202a and UE2 1202b) reach the eNB 1260 at the same time. This means that at the eNB 1260, both uplink and downlink subframes are time aligned.

The timing offset between uplink and downlink radio frames at the UE 1202, noted as $N_{TA}$, is expressed in units of $T_S$. Transmission of the uplink radio frame number i from the UE 1202 may start $(N_{TA}+N_{TA\ offset})\times T_S$ seconds before the start of the corresponding downlink radio frame at the UE 1202, where $0 \leq N_{TA} \leq 20512$. For frame structure type 1 $N_{TA\ offset}=0$ and for frame structure type 2 $N_{TA\ offset}=624$ unless stated otherwise in 3GPP TS 36.213.

With a LAA UL slot structure, the UL LAA backoff slots will not be aligned between UE1 1202a and UE2 1202b due to different TA values, as illustrated in FIG. 12. The UL LAA CCA slots 1267a,b of UE1 1202a are not aligned with the UL LAA CCA slots 1267c,d of UE2 1202b. Considering a fixed contention access region with the length of 1 or 2 OFDM symbols, the TA value also reduces the length of the remaining slot in the CCA slot structure.

FIG. 13 illustrates an example of TA adjustment for UL CCA slot alignment. This example includes an eNB 1360, a first UE (UE1) 1302a and a second UE (UE2) 1302b. The UEs 1302 have different TA values and different distances to the eNB 1360.

The eNB 1360 may send a downlink subframe 1363a. The first UE 1302a receives the downlink subframe 1363b and the second UE 1302b receives the downlink subframe 1363c. The first UE 1302a sends an uplink subframe 1365a and the second UE 1302b sends an uplink subframe 1365b.

To align the UL LAA CCA slots of UEs 1302 (e.g., UL LAA CCA slots 1367a,b of UE1 and UL LAA CCA slots 1367c,d of UE2) with different TA values, the eNB 1360 may signal a maximum TA value to the LAA UEs 1302 in the LAA cell. The maximum TA value (TAmax) can be signaled by the eNB 1360 as $N_{TA\ max}$, expressed in units of $T_S$. And the CCA slots are aligned at the UEs 1302 based on its own TA value and the signaled maximum TA value. This allows synchronized UL CCA slots among UEs 1302. The CCA slots are aligned with the adjusted TA value of a UE 1302 is given by Equation (1).

In FIG. 13, the maximum TA is noted as TAmax=2δ, the adjusted TA value for the UL LAA CCA slots 1367 is (δ+δ1) for UE1 and (δ+δ2) for UE2, respectively. The CCA slots are aligned together between UE1 and UE2 after the TA adjustment.

Figure 14:
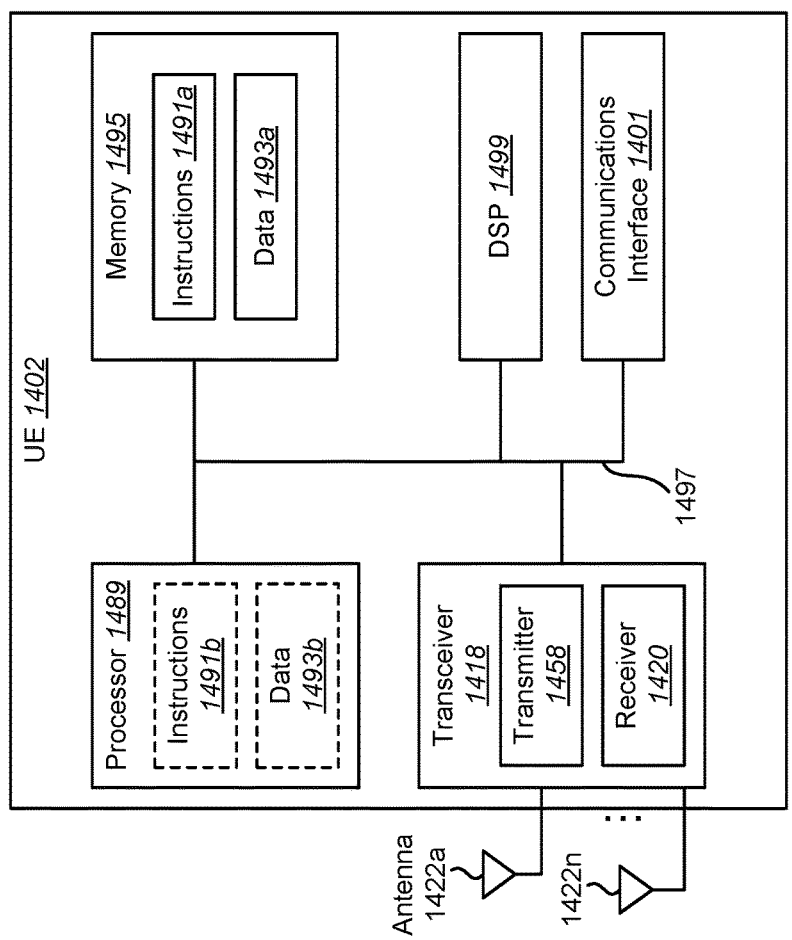
FIG. 14 illustrates various components that may be utilized in a UE.

FIG. 14 illustrates various components that may be utilized in a UE 1402. The UE 1402 described in connection with FIG. 14 may be implemented in accordance with the UE 102 described in connection with FIG. 1. The UE 1402 includes a processor 1489 that controls operation of the UE 1402. The processor 1489 may also be referred to as a central processing unit (CPU). Memory 1495, which may include read-only memory (ROM), random access memory (RAM), a combination of the two or any type of device that may store information, provides instructions 1491a and data 1493a to the processor 1489. A portion of the memory 1495 may also include non-volatile random access memory (NVRAM). Instructions 1491b and data 1493b may also reside in the processor 1489. Instructions 1491b and/or data 1493b loaded into the processor 1489 may also include instructions 1491a and/or data 1493a from memory 1495 that were loaded for execution or processing by the processor 1489. The instructions 1491b may be executed by the processor 1489 to implement the method 200 described above.

The UE 1402 may also include a housing that contains one or more transmitters 1458 and one or more receivers 1420 to allow transmission and reception of data. The transmitter(s) 1458 and receiver(s) 1420 may be combined into one or more transceivers 1418. One or more antennas 1422a-n are attached to the housing and electrically coupled to the transceiver 1418.

The various components of the UE 1402 are coupled together by a bus system 1497, which may include a power bus, a control signal bus and a status signal bus, in addition to a data bus. However, for the sake of clarity, the various buses are illustrated in FIG. 14 as the bus system 1497. The UE 1402 may also include a digital signal processor (DSP) 1499 for use in processing signals. The UE 1402 may also include a communications interface 1401 that provides user access to the functions of the UE 1402. The UE 1402 illustrated in FIG. 14 is a functional block diagram rather than a listing of specific components.

Figure 15:
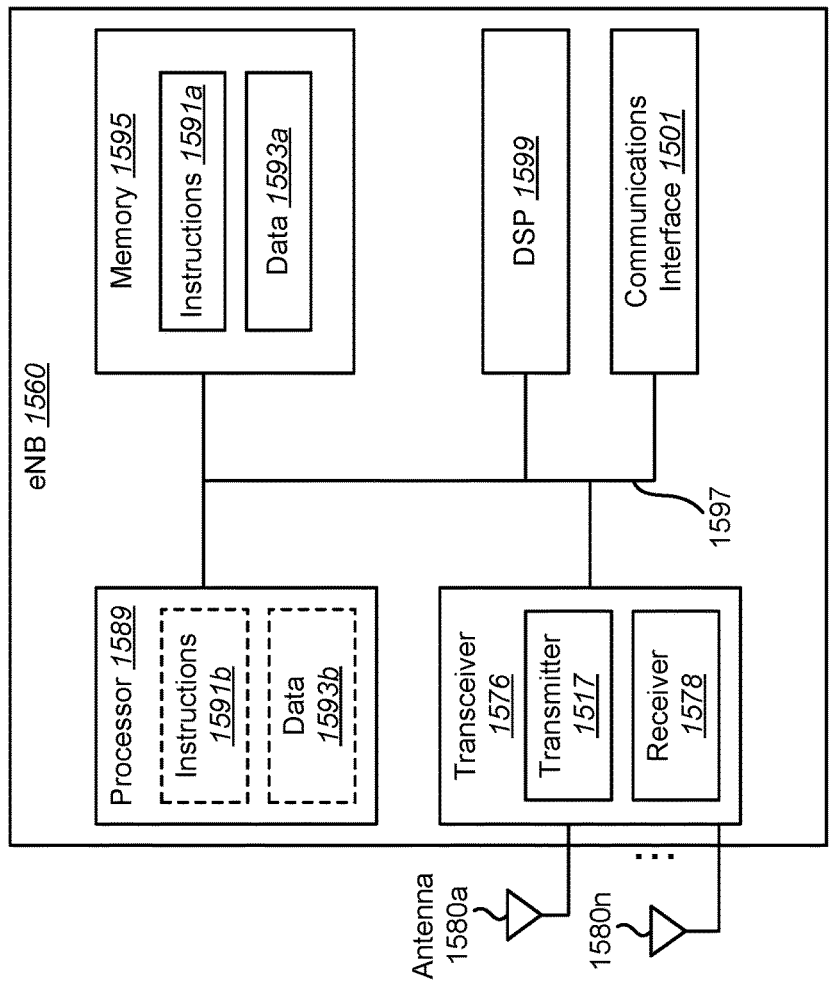
FIG. 15 illustrates various components that may be utilized in an eNB.

FIG. 15 illustrates various components that may be utilized in an eNB 1560. The eNB 1560 described in connection with FIG. 15 may be implemented in accordance with the eNB 160 described in connection with FIG. 1. The eNB 1560 includes a processor 1589 that controls operation of the eNB 1560. The processor 1589 may also be referred to as a central processing unit (CPU). Memory 1595, which may include read-only memory (ROM), random access memory (RAM), a combination of the two or any type of device that may store information, provides instructions 1591a and data 1593a to the processor 1589. A portion of the memory 1595 may also include non-volatile random access memory (NVRAM). Instructions 1591b and data 1593b may also reside in the processor 1589. Instructions 1591b and/or data 1593b loaded into the processor 1589 may also include instructions 1591a and/or data 1593a from memory 1595 that were loaded for execution or processing by the processor 1589. The instructions 1591b may be executed by the processor 1589 to implement one or more methods described above.

The eNB 1560 may also include a housing that contains one or more transmitters 1517 and one or more receivers 1578 to allow transmission and reception of data. The transmitter(s) 1517 and receiver(s) 1578 may be combined into one or more transceivers 1576. One or more antennas 1580*a-n* are attached to the housing and electrically coupled to the transceiver 1576.

The various components of the eNB 1560 are coupled together by a bus system 1597, which may include a power bus, a control signal bus and a status signal bus, in addition to a data bus. However, for the sake of clarity, the various buses are illustrated in FIG. 15 as the bus system 1597. The eNB 1560 may also include a digital signal processor (DSP) 1599 for use in processing signals. The eNB 1560 may also include a communications interface 1501 that provides user access to the functions of the eNB 1560. The eNB 1560 illustrated in FIG. 15 is a functional block diagram rather than a listing of specific components.

Figure 16:
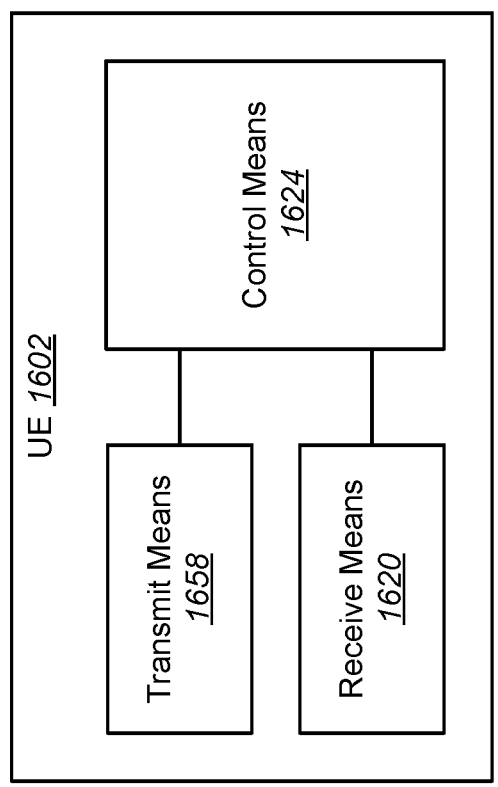
FIG. 16 is a block diagram illustrating one implementation of a UE in which systems and methods for performing LAA may be implemented.

FIG. 16 is a block diagram illustrating one implementation of a UE 1602 in which systems and methods for performing LAA may be implemented. The UE 1602 includes transmit means 1658, receive means 1620 and control means 1624. The transmit means 1658, receive means 1620 and control means 1624 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
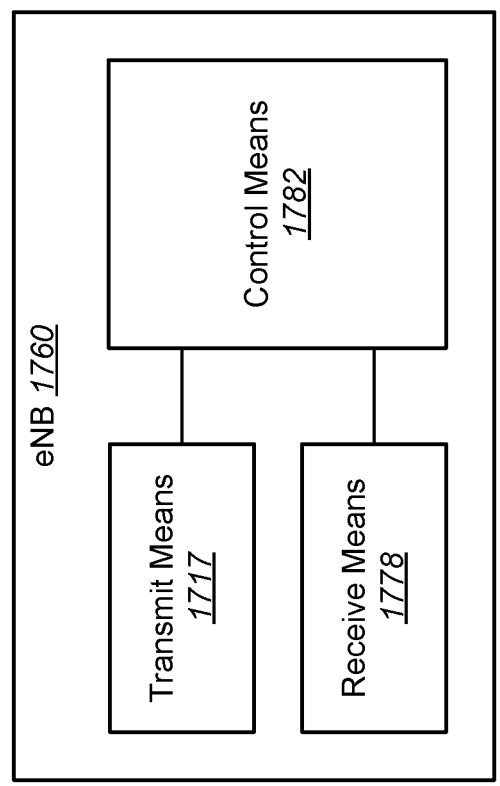
FIG. 17 is a block diagram illustrating one implementation of an eNB in which systems and methods for performing LAA may be implemented.

FIG. 17 is a block diagram illustrating one implementation of an eNB 1760 in which systems and methods for performing LAA may be implemented. The eNB 1760 includes transmit means 1717, receive means 1778 and control means 1782. The transmit means 1717, receive means 1778 and control means 1782 may be configured to perform one or more of the functions described in connection with FIG. 1 above. FIG. 15 above illustrates one example of a concrete apparatus structure of FIG. 17. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) for transmitting, signals in a Licensed-Assisted Access (LAA) serving cell, comprising:
a processor; and
a memory in electronic communication with the processor, wherein instructions stored in the memory are executable by the processor to:
receive an uplink (UL) grant from a downlink control information;
determine UL contention access region based on the UL grant, wherein the UL contention access region has a fixed length and location in a subframe;
determine clear channel assessment (CCA) timeslots in the UL contention access region, wherein the CCA timeslots are allocated from one end of the UL contention access region, and a contention window size of UL listen before talk (LBT) is determined based on an available number of CCA timeslots in the UL contention access region;
and perform UL contention access in the UL contention access region with a backoff process.

2. The UE of claim 1, wherein the UL contention access includes a backoff counter that is generated randomly within a contention window size, and a backoff counter that continuously counts down regardless of channel status.

3. The UE of claim 2, wherein if the backoff counter reaches 0, and if the channel status is idle, then the UE transmits a UL LAA transmission as scheduled.

4. The UE of claim 2, wherein if the backoff counter reaches 0, and if the channel status is not idle, then the UE drops a scheduled UL LAA transmission.

5. A method for transmitting signals in a Licensed-Assisted Access (LAA) serving cell by a user equipment (UE), comprising:
receiving an uplink (UL) grant from a downlink control information;
determining a UL contention access region based on the UL grant, wherein the UL contention access region has a fixed length and location in a subframe;
determining clear channel assessment (CCA) timeslots in the UL contention access region, wherein the CCA timeslots are allocated from one end of the UL contention access region, and a contention window size of UL listen before talk (LBT) is determined based on an available number of CCA timeslots in the UL contention access region; and
performing UL contention access in the UL contention access region with a backoff process.

6. The method of claim 5, wherein the UL contention access includes a backoff counter that is generated randomly within a contention window size, and a backoff counter that continuously counts down regardless of channel status.

7. The method of claim 6, wherein if the backoff counter reaches 0, and if the channel status is idle, then the UE transmits a UL LAA transmission as scheduled.

8. The method of claim 6, wherein if the backoff counter reaches 0, and if the channel status is not idle, then the UE drops a scheduled UL LAA transmission.

* * * * *

UNITED STATES PATENT AND TRADEMARK OFFICE
CERTIFICATE OF CORRECTION

PATENT NO. : 9,967,902 B2
APPLICATION NO. : 15/423038
DATED : May 8, 2018
INVENTOR(S) : Zhanping Yin et al.

Page 1 of 1

It is certified that error appears in the above-identified patent and that said Letters Patent is hereby corrected as shown below:

In the Specification

In Column 19, Line 9 please delete "62" and replace it with --$\delta 2$--.

In the Claims

In Column 23, Line 14 please delete "determine UL" and replace it with --determine a UL--.

Signed and Sealed this
Sixth Day of November, 2018

Andrei Iancu
*Director of the United States Patent and Trademark Office*